Figure 1:
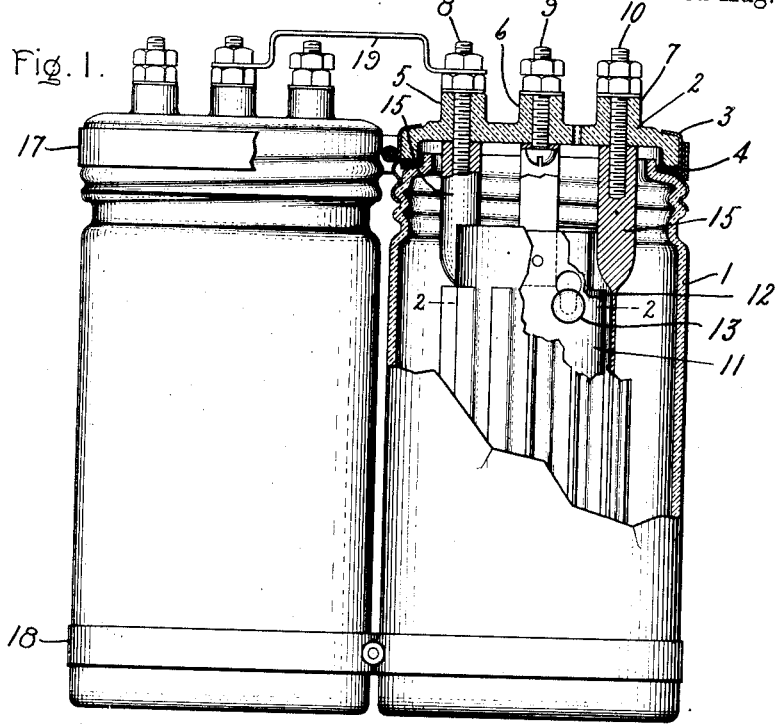

E. E. F. CREIGHTON.
LIGHTNING ARRESTER.
APPLICATION FILED AUG. 3, 1908.

1,034,883.

Patented Aug. 6, 1912.

Witnesses:

Inventor:
Elmer E. F. Creighton,
by Albert G. Davis
Att'y.

UNITED STATES PATENT OFFICE.

ELMER E. F. CREIGHTON, OF SCHENECTADY, NEW YORK, ASSIGNOR TO GENERAL ELECTRIC COMPANY, A CORPORATION OF NEW YORK.

LIGHTNING-ARRESTER.

1,034,883.  Specification of Letters Patent.  Patented Aug. 6, 1912.

Application filed August 3, 1908. Serial No. 446,516.

*To all whom it may concern:*

Be it known that I, ELMER E. F. CREIGHTON, a citizen of the United States, residing at Schenectady, county of Schenectady, State of New York, have invented certain new and useful Improvements in Lightning-Arresters, of which the following is a specification.

My present invention relates to lightning arresters and comprises an arrester of the aluminum electrode type possessing certain new features of construction and also embodying certain new principles of operation.

The specific embodiment hereinafter described as illustrative of my invention, is particularly adapted for use on street railway systems and other direct current circuits operating at about 600 volts.

The novel features of my invention are pointed out in the appended claims, for a better understanding of which reference may be had to the following description taken in conjunction with the drawing forming a part of this specification.

Figure 2:
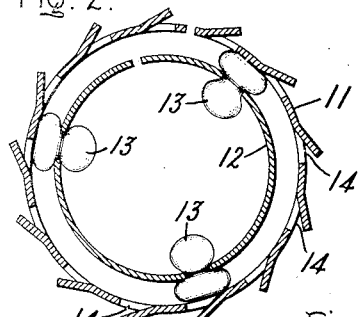
Figure 3:
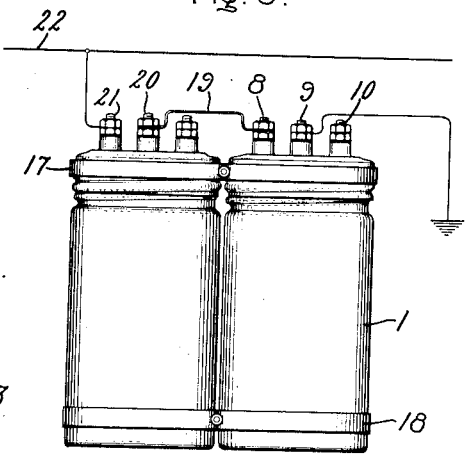
Figure 4:
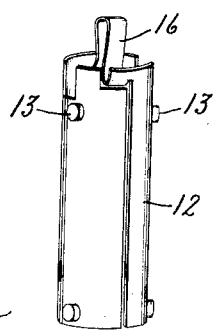

In the drawing, Figure 1 is an elevation of the arrester with certain parts broken away; Fig. 2 is a cross-section of the electrodes on the line 2—2 of Fig. 1; Fig. 3 illustrates the manner of connecting up the arrester; and Fig. 4 is an elevation of the negative or inner electrode of a cell.

Each arrester comprises two cells strapped together and operative in series. Each cell comprises a glass jar 1 with a porcelain cover 2 clamped thereon by means of a screw-threaded cap 3. A felt washer 4 may be used to separate the cap from the top of the jar. The porcelain cover is provided with lugs 5, 6 and 7 through which pass screw-threaded studs 8, 9 and 10 connected with suitable electrodes within the jar. Two electrodes 11 and 12 are arranged concentrically as shown in Fig. 2. These electrodes are of aluminum and are separated by glass studs or spacers 13 projecting through openings in the inner electrode 12. The outer electrode 11 is cut lengthwise for a considerable portion of its length and parts of the electrode are bent upward to form a row of windows 14 through which the electrolyte of the cell can freely circulate and through which the electric current can pass from the inner electrode to the outer surface of the outer electrode. By slotting the electrode 11 longitudinally and bending the parts of the electrode adjacent the slots upward to leave windows 14, as best shown in Fig. 2, the active surface of the electrode remains a maximum and is the same as though the electrode had no openings or windows, while at the same time the electrolyte can circulate freely through the windows and over the surface of the electrode. Both electrodes are provided with terminals for connection with the external circuit. The outer plate 11 is provided with integral lugs 15 cast to the upper edge of the plate and screw-threaded to the studs 8 and 10. The inner electrode 12 may be provided with a similar cast lug or may, if desired, be constructed as shown in Fig. 4 by cutting a slit along the edge of the plate and bending up a strap 16 to which connection can be made. Either of these forms of connection is free from contact-surfaces that might become corroded or otherwise defective.

Both jars of the arrester are alike in construction and the two are rigidly clamped together by means of metal bands 17 and 18 arranged, respectively, at top and bottom. The top band 17 has the additional function of gripping the screw-threaded caps 3 used to hold the covers on the jars and thereby prevent accidental unscrewing.

As the electrolyte of the cell, I prefer to use an acid solution of ammonium tartrate to which a small quantity of glycerin has been added. A layer of oil may be placed on the surface of the electrolyte to prevent evaporation.

In Fig. 3 is illustrated the manner of connecting the arrester in circuit. The central or negative terminal 9 of jar 1 is connected directly to ground while one of the positive terminals, say terminal 8, is connected by a suitable conductor 19 to the central or negative terminal 20 of the other cell. The positive electrode 21 of the latter is connected directly to a conductor 22 to be protected. This conductor may be any part of a direct current system having a voltage in the neighborhood of 600 volts.

When current is passed between aluminum electrodes through a suitable electrolyte, such as that above mentioned, a thin insulating film forms on the anode or positive plate and immediately insulates the plate from the electrolyte and thereby shuts off the flow of current. In an ammonium tartrate solution this film, though very thin, does not break down or puncture at a potential much below 420 volts. It will, therefore, be seen that the total break down voltage of two cells in series is in the neighborhood of 800 or 900 volts. By using two cells in series on a 600 volt system the working potentials are well below the break down point of the cells and little or no current will flow through to ground. There is, of course, a slight passage of energy necessary to form and maintain the insulating films on the positive plates but the quantity of energy thus escaping to ground is insignificant.

When an abnormal potential arises on conductor 22, Fig. 3, it is prevented from escaping to ground only by the insulating films on the two positive electrodes of the cells. If the abnormal potential is higher than the break down voltage of these films in series, the films will puncture and the abnormal charge will escape. As previously stated, the break down voltage of the two cells in series amounts to about 800 or 900 volts so that for a 600 volt system the potential can never rise to twice the normal running voltage of the system. Ample protection to the motors and other equipment is, therefore, insured. The protective device is effective not only against lightning and other atmospheric disturbances, but also against abnormal potentials arising from short-circuits, bad motor commutation, or any of the disturbing factors incident to street railway work.

It will be understood that the films act like valves and allow the escape of heavy current only when the line pressure is above normal.

What I claim as new and desire to secure by Letters Patent of the United States, is,—

1. An electrolytic cell comprising a vessel containing electrolyte, a cover for said vessel, and concentric cylindrical electrodes secured to said cover in fixed relation to each other to project into the electrolyte, one of said electrodes having portions bent radially outward to form windows through which the electrode can circulate radially of said electrodes.

2. An electrolytic cell comprising a vessel containing electrolyte, a cover for said vessel, concentric cylindrical electrodes secured to said cover to project into the electrolyte in definite relation to each other, the outer electrode having longitudinal strips bent in a radial direction to leave vertical windows through which the electrolyte may circulate radially of said electrodes.

3. An electrolytic cell comprising a vessel containing electrolyte, a cover detachably secured to said vessel, concentric open ended cylindrical electrodes secured to the inner surface of said cover to cause their open ends to project vertically downward into said electrolyte, the outer electrode having in the portion submerged in the electrolyte longitudinal vertical strips bent outward in a radial direction to leave longitudinal windows and having two diametrically opposite lugs for engaging the inner surface of said cover, and the inner electrode having a lug with an extended surface for engaging the inner surface of said cover, and conducting clamping members extending through said cover and coöperating with said lugs to clamp said electrodes rigidly to said cover.

4. In an aluminum arrester, the combination of a plurality of jars, a cover for each of said jars, a cap for holding each of said covers in position, aluminum plates supported by said covers, and a band encircling said jars and tightly gripping said caps.

In witness whereof, I have hereunto set my hand this 31st day of July, 1908.

ELMER E. F. CREIGHTON.

Witnesses:
BENJAMIN B. HULL,
HELEN ORFORD.